United States Patent [19]
Kenwell

[11] 4,355,249
[45] Oct. 19, 1982

[54] DIRECT CURRENT MOTOR HAVING OUTER ROTOR AND INNER STATOR

[76] Inventor: Rudolf F. Kenwell, 11143 - 50 Ave., Edmonton, Alberta, Canada, T6H 0J1

[21] Appl. No.: 212,148

[22] Filed: Dec. 2, 1980

Related U.S. Application Data

[63] Continuation-in-part of Ser. No. 955,984, Oct. 30, 1978, abandoned.

[51] Int. Cl.³ .................................................. H02K 37/00
[52] U.S. Cl. ............................... 310/49 R; 310/67 R; 310/177; 310/185; 310/254
[58] Field of Search .................. 310/49 R, 67 R, 112, 310/162, 163, 180, 184, 185, 187, 188, 216, 218, 254, 255, 258, 259, 177

[56] References Cited

U.S. PATENT DOCUMENTS

| | | | |
|---|---|---|---|
| 1,850,598 | 3/1932 | Mills et al. | 310/49 R X |
| 2,112,852 | 4/1938 | Lindell | 310/49 R |
| 2,824,272 | 2/1958 | Delaporte | 310/49 R |
| 2,830,246 | 4/1958 | Thomas | 310/49 R X |
| 3,372,291 | 3/1968 | Lytle et al. | 310/49 R |
| 3,462,667 | 8/1969 | Jackson | 310/49 R X |
| 3,497,730 | 2/1970 | Doolittle | 310/49 R X |
| 3,806,744 | 4/1974 | Abraham et al. | 310/67 R X |
| 3,809,990 | 5/1974 | Kuo et al. | 310/49 R X |
| 3,921,017 | 11/1975 | Hallerback | 310/254 X |

*Primary Examiner*—Mark O. Budd
*Attorney, Agent, or Firm*—Max L. Wymore

[57] ABSTRACT

The stator of the motor comprises a series of stator rings arranged in cylindrical fashion. Each stator ring is made up of a circular row of electromagnetic components, each component comprising a U-shaped core having two outwardly projecting poles and individual coils for each of the poles. The stator rings are positioned so that their electromagnetic components are offset rotationally from one ring to the next. The rotor is mounted to rotate outside the stator and comprises a plurality of longitudinally arranged magnetic elements circumferentially spaced around the stator. In operation, the stator rings are energized sequentially by suitable switching means to generate a torque in the rotor. The motor has capacity for variable speed and variable torque.

8 Claims, 8 Drawing Figures

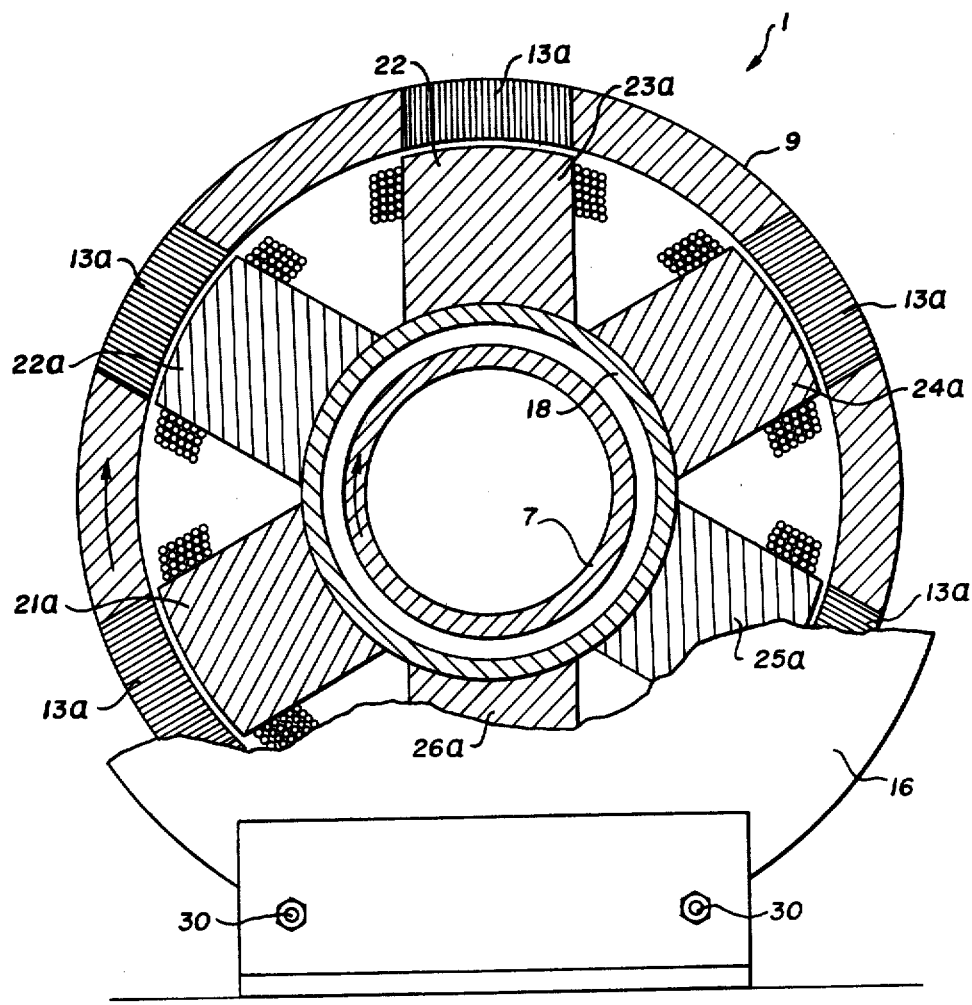

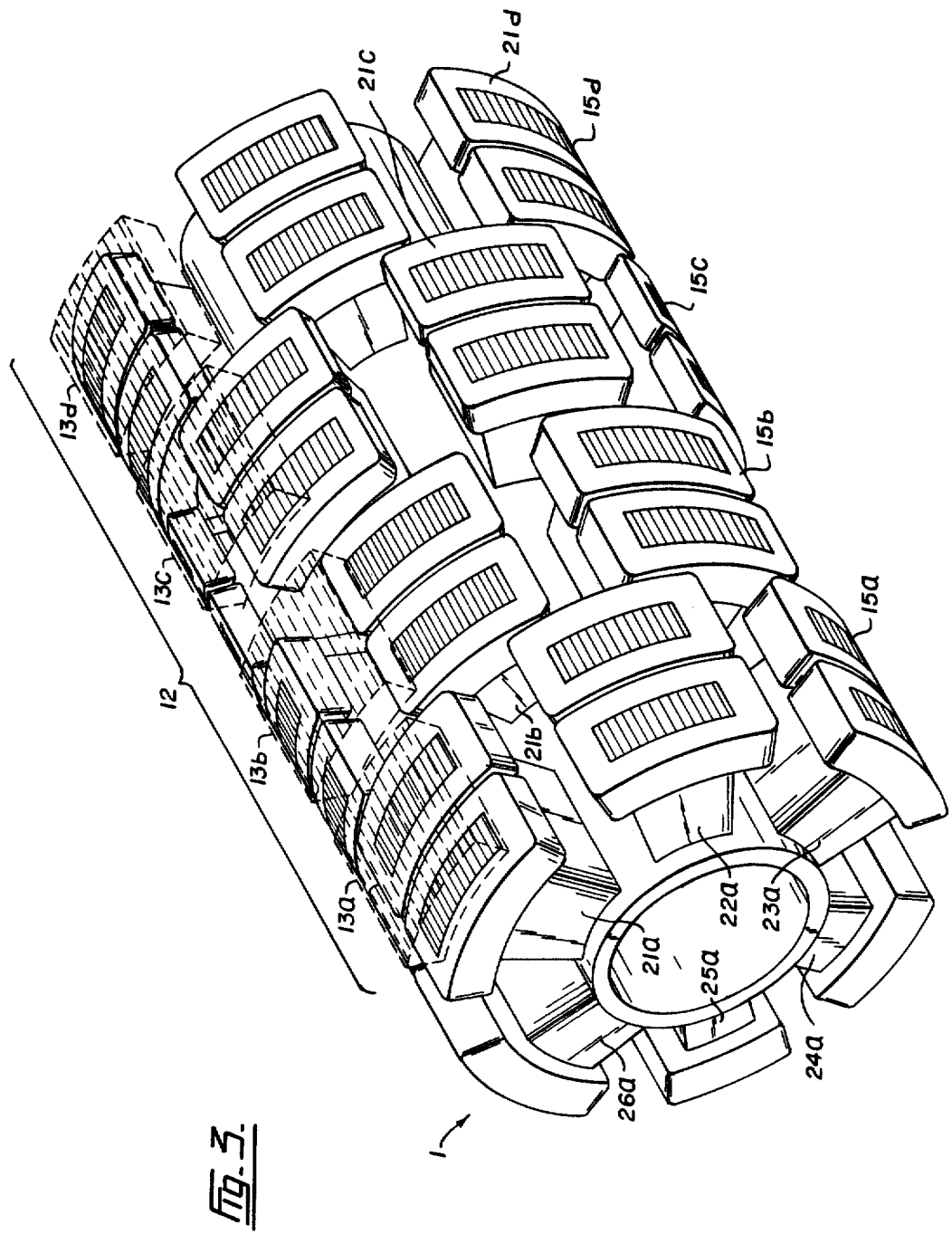

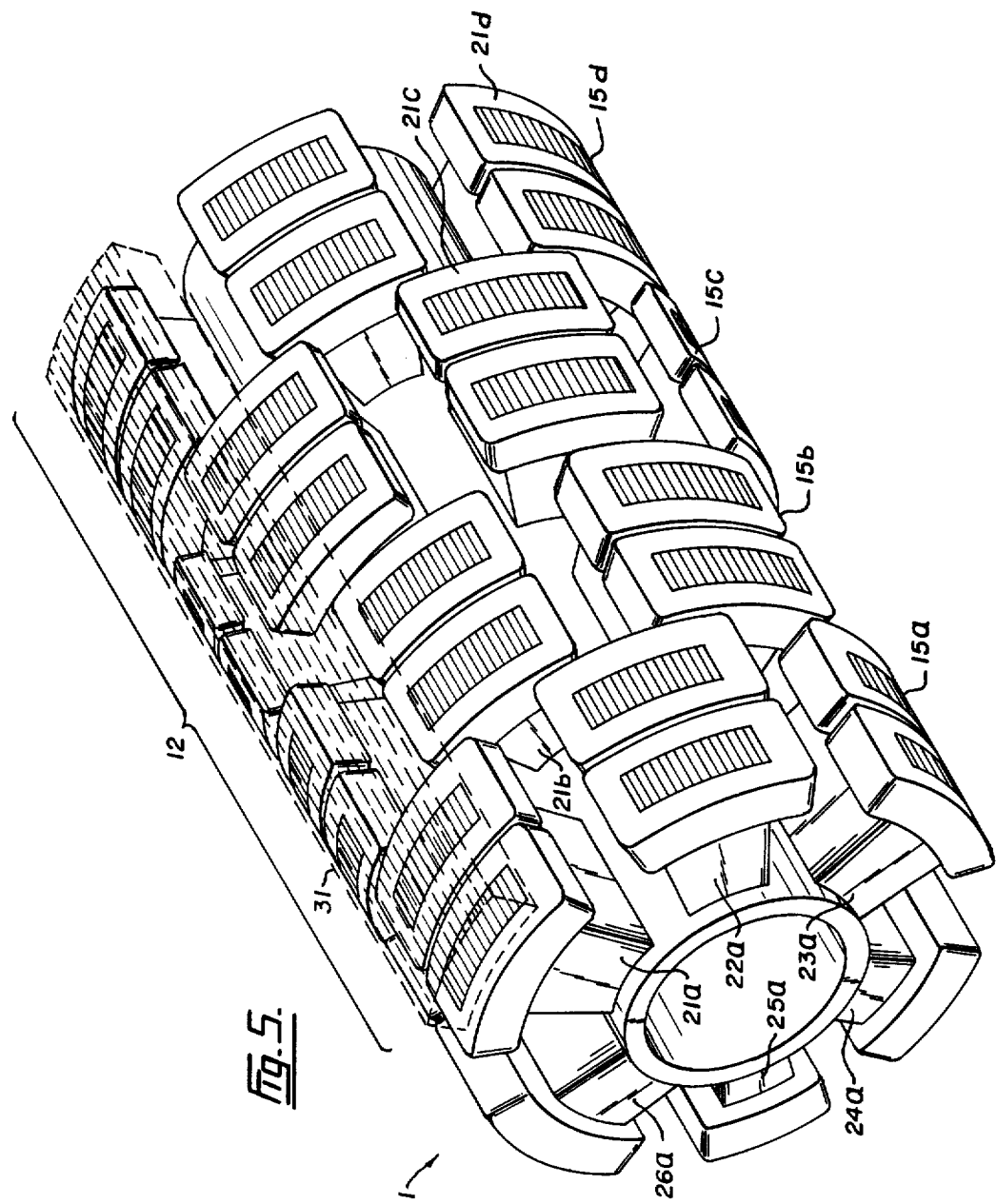

DIRECT CURRENT MOTOR HAVING OUTER ROTOR AND INNER STATOR

CROSS-REFERENCE TO RELATED APPLICATION

This application is a continuation-in-part of my application for U.S. Letters Patent Ser. No. 955,984 filed Oct. 30, 1978, now abandoned.

BACKGROUND OF THE INVENTION

The present invention relates to a cylindrical direct current motor. The motor may be provided with speed and/or torque control which can be reversed without changing power connections to the motor. Direct application for the motor is found in driving an electric car; additionally, it may be useful for driving elevators, milling machines and lathes, where infinitely variable speed and torque control and low speed-high torque characteristics are desirable.

There are many different motor structures shown in the prior art. Most of these motors involve inner rotors and require brushes, slip rings and the like. These prior art motors are not pertinent to the present case. A more pertinent motor is disclosed in U.S. Pat. No. 3,806,744 (Abraham et al). The Abraham motor involves an inner stator assembly, comprising a series of cylindrically arranged and sequentially energized stator rings, and an outer rotor, comprising a rotatable non-magnetic housing having rows of longitudinally extending magnetic inserts. Each stator ring is briefly energized to draw to it an adjacent magnetic insert. This procedure is repeated from stator ring to stator ring and thus the rotor is caused to rotate.

It will be noted that the Abraham motor involves stator rings which are energized by shared toroidal coils, magnetic inserts which are axially staggered in the rotor, and there is one more stator ring than the number of phases. These features have a substantial influence on the way the motor operates and on its characteristics. It is also noted that only half the stator poles of a ring actually react with rotor inserts at any given time since there are twice as many stator pole pairs per ring as there are rotor inserts.

SUMMARY OF THE INVENTION

It is the object of this invention to provide a cylindrical direct current motor which can readily and easily be manufactured, which is adapted for speed and torque control, and which can be reversed easily by electronic switching of the power connections to the stator assembly.

In accordance with the invention, there is provided a motor having a stationary inner stator assembly having a plurality of stator rings arranged in cylindrical fashion. Each stator ring is made up of a series of electromagnetic components, each such component comprising a core, preferably U-shaped, having a pair of poles and means, for example coils, for magnetizing and de-magnetizing the core. The stator rings are rotationally offset or staggered from one to the next. A rotatable rotor assembly is provided having a plurality of cylindrically arranged, longitudinally oriented magnetic elements which are positioned around the assembly of stator rings. The number of magnetic elements in the rotor assembly is preferably equal to the number of electromagnetic components in the stator ring.

As a result of this arrangement, the magnetic elements are in different orientation with respect to each ring of the assembly of longitudinally offset stator rings thus allowing for sequential magnetization and de-magnetization of the stator rings and subsequent sequential torque application to the rotor. It is further evident that with a plurality of stator rings sequentially magnetized and de-magnetized, a substantially smooth application of torque to the rotor assembly is achieved. It is also evident that, since each pole pair in each stator ring preferably has a corresponding magnetic element in the rotor assembly, a desirable conversion of electromagnetic force to torque is achieved.

Broadly stated, the invention provides a direct current motor comprising: a stationary stator assembly comprising a plurality of stator rings, each such stator ring comprising a plurality of individual electromagnetic components circumferentially arranged on the stator ring, each such electromagnetic component comprising a pair of poles, the poles of each pair being axially aligned and outwardly facing, and energizing means for magnetizing and de-magnetizing said pair of poles, each stator ring pole having individual energizing means; means for supporting said stator rings; said stator rings being cylindrically arranged on said support means in angularly offset configuration; and a rotatable rotor assembly mounted to rotate outside the stator assembly comprising a plurality of longitudinally oriented and cylindrically arranged magnetic elements positioned around the assembly of stator rings; whereby said stator rings may be sequentially magnetized and de-magnetized to rotate said rotor assembly, the energizing time for each stator ring may be varied, and the number of electromagnetic components energized in each stator ring may be varied.

DESCRIPTION OF THE DRAWINGS

FIG. 2 is an end-wise sectional view of the motor shown in FIG. 1, showing one stator ring of the stator assembly positioned directly under the corresponding magnetic element of the rotor assembly;

FIG. 3 is an isometric view of the motor;

FIG. 5 is an isometric view of a second embodiment of the motor wherein the magnetic elements of the rotor assembly comprise iron laminates in bar form.

DETAILED DESCRIPTION OF THE INVENTION

The theory and functioning of pulsed direct current motors is well known in the art and no attempt is made herein to describe the electrical circuitry and means required to drive and operate the basic structure of the motor which is the subject matter of the present invention.

Figure 1:
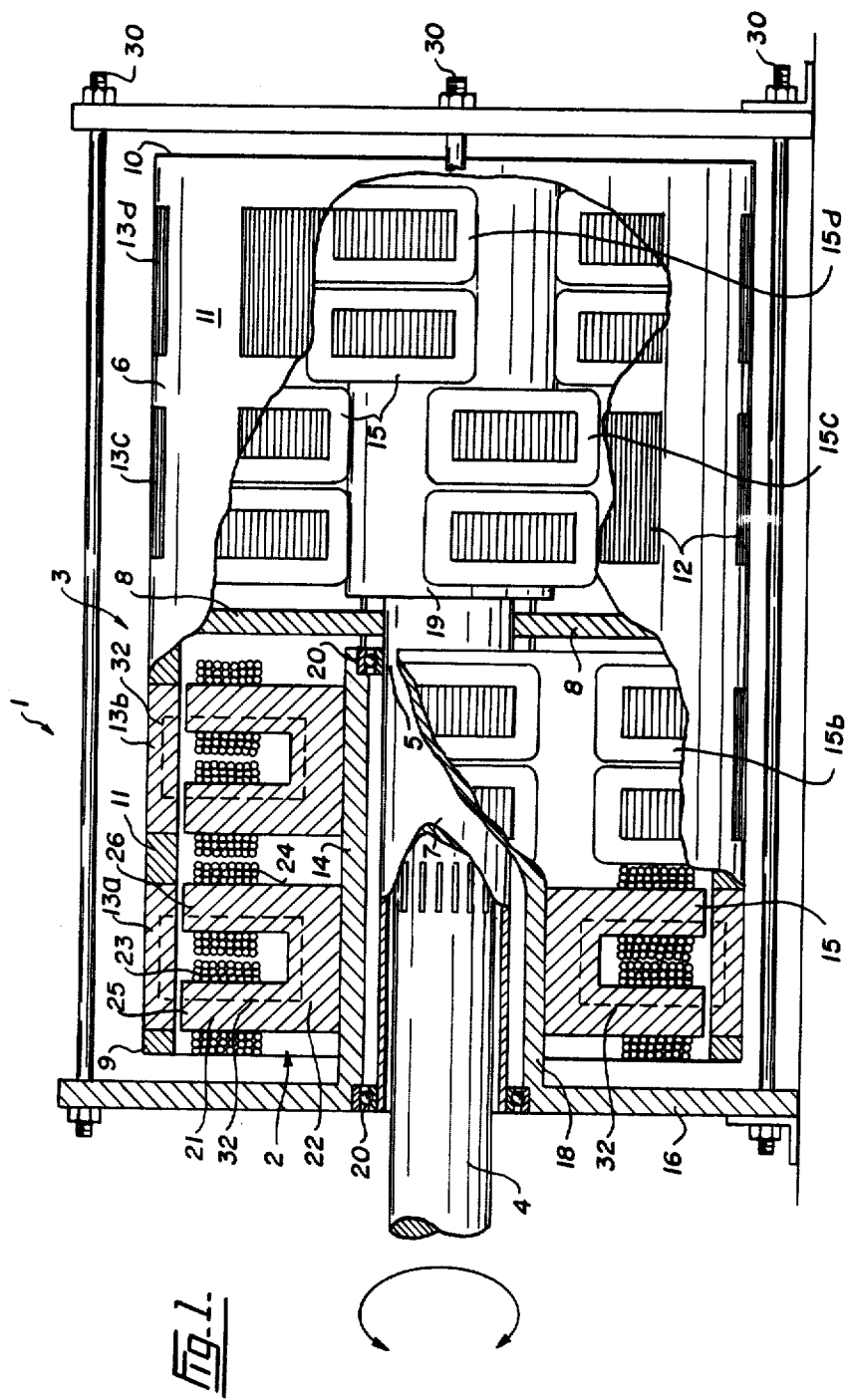
FIG. 1 is a side view of the motor, partly broken away, and partly in cross-section.
Figure 4A:
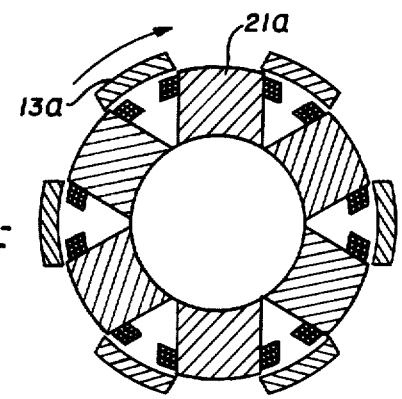
FIGS. 4a, 4b, 4c and 4d are simplified schematic drawings showing the rotor assembly in four different positions with respect to the stator assembly.
Figure 4B:
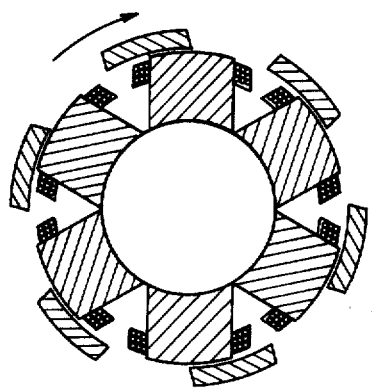
Figure 4C:
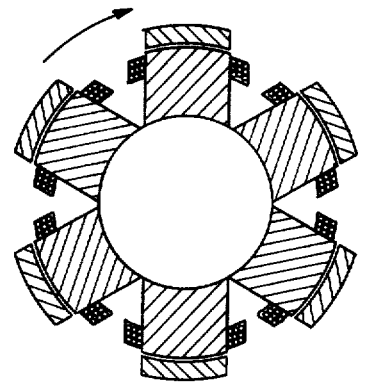
Figure 4D:
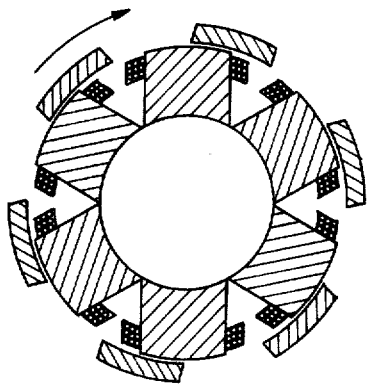

With reference to FIG. 1, there is provided a direct current motor 1 having an inner stationary stator assembly 2 and an outer rotatable rotor assembly 3. The former is connectable to a source of electrical power and the latter is shown connected to an output shaft 4.

ROTOR ASSEMBLY

As shown in FIGS. 1 and 2, the rotor assembly 3 comprises a support frame 5 carrying a non-magnetic cylindrical frame 6. The support frame 5 includes a tubular member 7, splined onto the output shaft 4, and a webbing member 8 which extends outwardly radially from the tubular member 7. The cylindrical frame 6 includes end rings 9, 10 connected with a longitudinally extending cylindrical cage member 11.

In a first embodiment of the rotor assembly, as shown in FIGS. 1 to 4, a plurality of magnetic elements 12 are retained in the cage member 11. Each magnetic element 12 consists of a row of longitudinally aligned magnetic inserts 13a, 13b, 13c and 13d spaced along the length of the cage member 11. The rows are spaced evenly around the circumference of the stator assembly 2.

In a second embodiment of the rotor assembly, as shown in FIG. 5, the magnetic elements 12 comprise a plurality of longitudinal magnetic bars 31 spaced evenly around the circumference of the stator 2. The magnetic elements, in bar or insert form are preferably constructed from laminates of iron. It will be understood by those persons skilled in the art that solid motor iron, permanent magnets, coil energized poles or combinations of these elements could be used in rotor assembly.

STATOR ASSEMBLY

The stator assembly 2 comprises a stationary support structure 14 carrying a plurality of stator rings 15. In the embodiment shown, four stator rings are used and they are numbered 15a, 15b, 15c and 15d.

The support structure 14 comprises ground-supported vertical end plates 16, 17 having attached central tubular members 18, 19 extending horizontally therefrom. The end plates 16, 17 are fixed together by tie rods 30. The tubular members 18, 19 of the stator assembly 2 encircle the tubular member 7 of the rotor assembly 3 and are carried thereon by bearings 20. The stator rings 15 are mounted on the tubular members 18, 19 and form a cylindrical structure.

Each stator ring 15 comprises a plurality of electromagnetic components 21. Each such component 21 comprises a U-shaped core 22 and a pair of wire coils 23, 24. Each of the poles 25, 26 of each core 22 is thus individually energized by one of the coils 23, 24. (The component, core, coils and poles of the stator ring 15a are numbered respectively 21a, 22a, 23a, 24a, 25a, 26a. This system is carried on for the other stator rings as well.)

In the two embodiments shown, each stator ring 15 has six electromagnetic components 21 spaced evenly around the supporting tubular member 18 or 19. In the first embodiment of the invention the magnet inserts 13a, 13b, 13c and 13d of each magnetic element 12 are preferably arranged so that one insert registers with or is positioned to co-act with each of the four stator rings 15a, 15b, 15c and 15d. Thus there are preferably a total of twenty-four magnetic inserts, twenty-four electromagnetic components and forty-eight poles and coils provided in the motor illustrated. In the second embodiment of the invention, the number of magnetic bars 31 is preferably equal to the number of electromagnetic components 21 in each stator ring 15. The coils are wired independently so that they can be independently, or as a pair installed or removed.

The above-described arrangements of the electromagnetic components 21 and the magnetic elements 12 set up a magnetic flux path 32, as shown in FIG. 1, with electromagnetic component 21.

The stator rings 15 are arranged in a staggered configuration. In the embodiments shown, stator ring 15a is offset from stator ring 15b by one pole length rotation in a clockwise direction. Stator rings 15b and 15c are offset by one half pole length rotation in a clockwise direction. Stator rings 15c and 15d are offset by one pole length rotation in a clockwise rotation. The angular offset of the stator rings is provided so that, upon sequential energization of the stator rings, substantially steady torque is applied to the rotor. With the above-described angular offset, the sequence of energization would be 15a, 15c, 15b and then 15d for clockwise rotation.

It should be pointed out that the above-described angular offset between the stator rings 15 enables one to manufacture the stator assembly 2 in two identical halves. Thus each half of the stator assemblies can be cast from one die to reduce manufacturing costs. Further, the one pole length offset between stator rings 15a and 15b and between stator rings 15c and 15d minimizes electromagnetic interference between the electromagnetic components in adjacent rings. The stator rings 15b and 15c, while being offset by only one half a pole length, are spaced by the webbing member 8 of the rotor assembly, to thereby minimize any electromagnetic interference therebetween.

It will be understood by those skilled in the art that the stator assembly can have any number of poles and stator rings. Similarly, the angular offset between the rings may be changed. Preferably there is a one half pole length offset provided between sequentially energized stator rings in order to apply a steady torque to rotor. Thus, for the above energization sequence 15a, 15c, 15b and 15d, a half pole length offset is provided between stator rings 15a and 15c, 15c and 15b, and 15b and 15d.

Further, it is preferable to include an even number of stator rings in the motor. This feature enables one to optionally energize two stator rings at once while still maintaining smooth rotation of the rotor.

To obtain the advantages of all of the above-desired features, the stator assembly 2 preferably includes a multiple of four stator rings, arranged in two halves.

OPERATION

In operation, the coils 23, 24 of each stator ring are briefly energized, the stator rings 15a, 15c, 15b and 15d being energized in recurring sequence. In the case of stator ring 15a, its coils 23a, 24a are energized as the magnetic inserts 13a or magnetic bar 31 approach the electromagnetic components 21a. When components 21a are energized, a magnetic field is generated in the cores 22a which causes the six magnetic inserts 13a or six magnetic bars 31 to be attracted, thereby setting up a torque in rotor assembly 3. As the magnetic inserts 13a come into alignment with the electromagnetic components 21a, the coils 23a, 24a are de-energized, the electromagnetic component is thus de-magnetized, and another stator ring is then energized. This sequence is illustrated in FIGS. 4a to 4d.

It will be appreciated that, depending upon the level of energization, the number of coils energized, and the energizing time for given coils and consequently the magnetizing time for the stator poles, the amount of force and the length of time the force is applied to the magnetic inserts of the rotor assembly 3 can be varied, thereby controlling the output of the motor.

If desirable in a multi-stator ring system, two or more stator rings may be energized at a given time. That is, there is an overlap of time during which energization of two or more stator rings may occur. This would provide beneficial torque on the rotor.

If each stator ring is energized for a very short time, so that there is some time when no stator rings are energized during the rotation of the rotor assembly, then the rotor assembly is subjected to discrete torque pulses or steps rather than the semi-continuous torque application described above.

It will further be appreciated that by rearranging the energizing order of the stator rings 15, the rotor assembly 3 may be activated to rotate in a reverse direction.

ADVANTAGES

Some of the advantages of the invention over prior art devices, particularly a commutator-type motor are:

The motor may be provided with a relatively large diameter internal tubular opening which allows for provision of a differential internal the motor.

The individual electromagnetic stator parts can be inexpensively mass produced and easily replaced upon failure.

Failure of a single electromagnetic part does not cause total failure of the motor.

When any electromagnetic component is energized, it has an adjacent rotor assembly magnetic element with which to co-act.

Since the electromagnetic components are individual for each stator ring, rather than being shared (as in Abraham), adjacent stator rings may have overlapping energization times.

The stator assembly can be manufactured in two identical halves from one die to thereby reduce manufacturing costs.

The fact that the motor does not require a motor housing, together with the provision of the outer rotor, provide excellent static and dynamic motor ventillation.

A failure in the electronic switching to the stator assembly, whereby the switch remains closed, will lock the rotor assembly aligned over the electromagnetic components which remain energized. Thus this type of switching failure, in the present invention, acts as a safety brake. In a conventional commutator-type motor, this type of switching failure can cause the rotor to run uncontrollably.

The majority of electric motors operate either with a fixed torque output at a particular RPM setting or with a fixed RPM output at a particular torque setting. The motor of the present invention, by virtue of the individual energizable electromagnetic components and stator rings, has a more flexible operation. At any given RPM setting, the torque output can be varied, or conversely, at a given torque setting, the RPM output can be varied.

With the provision of individually energizable electromagnetic components one can operate the motor to obtain at a low RPM or low torque output by energizing only a portion of the total number of electromagnetic components. This mode of operation limits the conventional coil and iron losses in the motor. In many conventional electric motors, one needs to energize all of the motor coils and iron, even at low RPM or low torque operation, and therefore coil and iron losses are greater.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of the invention in which an exclusive property or privilege is claimed are defined as follows:

1. A direct current motor comprising:
   a stationary stator assembly comprising
   a plurality of stator rings, each such stator ring comprising a plurality of individual electromagnetic components circumferentially arranged on the stator ring, each such electromagnetic component comprising a pair of poles, the poles of each pair being axially aligned and outwardly facing, and energizing means for magnetizing and de-magnetizing said pair of poles, each stator ring pole having individual energizing means;
   means for supporting said stator rings;
   said stator rings being cylindrically arranged on said support means in angularly offset configuration; and
   a rotatable rotor assembly mounted to rotate outside the stator assembly comprising a plurality of longitudinally oriented and cylindrically arranged magnetic elements positioned around the assembly of stator rings;
   whereby said stator rings may be sequentially magnetized and de-magnetized to rotate said rotor assembly, the energizing time for each stator ring may be varied, and the number of electromagnetic components energized in each stator ring may be varied.

2. The motor as set forth in claim 1 wherein:
   the number of longitudinally oriented magnetic elements is equal to the number of electromagnetic components in a stator ring.

3. The motor as set forth in claim 1 or 2 wherein:
   a one-half pole length angular offset is provided between sequentially energized stator rings.

4. A direct current motor comprising:
   a stationary stator assembly comprising
   a plurality of stator rings, each such stator ring comprising a plurality of individual electromagnetic components circumferentially arranged on the stator ring, each such electromagnetic component comprising a pair of axially aligned, outwardly facing poles, and energizable coil means for magnetizing and de-magnetizing said pair of poles, each stator ring pole having individual energizable coil means;
   means for supporting said stator rings;
   said stator rings being cylindrically arranged on said support means in angularly offset configuration; and
   a rotatable rotor assembly mounted to rotate outside the stator assembly comprising
   a plurality of longitudinally oriented and cylindrically arranged magnetic elements positioned around the assembly of stator rings;
   whereby said stator rings may be sequentially magnetized and de-magnetized to rotate said rotor assembly, the energizing time for each stator ring may be varied, and the number of electromagnetic components energized in each stator ring may be varied.

5. The motor as set forth in claim 4 wherein:
   the number of longitudinally oriented magnetic elements is equal to the number of electromagnetic components in a stator ring.

6. The motor as set forth in claim 5 wherein:
   a one-half pole length angular offset is provided between sequentially energized stator rings.

7. The motor as set forth in claim 6 wherein:
   each magnetic element comprises a plurality of spaced, longitudinally aligned magnetic inserts positioned to register with the stator rings, the number of the magnetic inserts being equal to the number of electromagnetic components in the stator assembly.

8. The motor as set forth in claim 6 wherein:
   each magnetic element comprises a longitudinal magnetic bar.

* * * * *